(12) United States Patent
Sugai et al.

(10) Patent No.: US 7,694,763 B2
(45) Date of Patent: Apr. 13, 2010

(54) VEHICLE AND ITS CONTROL METHOD

(75) Inventors: Shinichi Sugai, Toyota (JP); Kazuhito Hayashi, Inazawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 183 days.

(21) Appl. No.: 11/898,304

(22) Filed: Sep. 11, 2007

(65) Prior Publication Data

US 2008/0066978 A1    Mar. 20, 2008

(30) Foreign Application Priority Data

Sep. 14, 2006    (JP)    ............... 2006-249966

(51) Int. Cl.
*B60K 6/485*    (2007.10)
(52) U.S. Cl. ............... 180/65.26; 180/65.285; 701/22
(58) Field of Classification Search ........... 180/65.265, 180/65.21, 65.25, 65.245, 65.26, 65.7, 65.285; 477/3, 4, 20; 903/908, 910, 945; 701/20, 701/22
See application file for complete search history.

(56) References Cited

U.S. PATENT DOCUMENTS

| | | | |
|---|---|---|---|
| 5,720,690 A * | 2/1998 | Hara et al. ................. 477/20 |
| 6,459,980 B1 * | 10/2002 | Tabata et al. ........... 180/65.245 |
| 6,672,415 B1 * | 1/2004 | Tabata ..................... 180/65.25 |
| 6,719,076 B1 * | 4/2004 | Tabata et al. ............... 180/65.7 |
| 7,028,795 B2 * | 4/2006 | Tabata ..................... 180/65.21 |
| 7,273,120 B2 * | 9/2007 | Tabata ................... 180/65.265 |
| 7,374,509 B2 * | 5/2008 | Loeffler et al. ................ 477/4 |
| 7,384,371 B2 * | 6/2008 | Liebl et al. .................... 477/3 |
| 2001/0011050 A1 * | 8/2001 | Yamaguchi et al. ........... 477/3 |
| 2006/0108966 A1 * | 5/2006 | Kamio et al. ............... 318/701 |
| 2007/0135261 A1 * | 6/2007 | Berger et al. ................. 477/96 |
| 2007/0155581 A1 * | 7/2007 | Tabata et al. .................. 477/3 |

FOREIGN PATENT DOCUMENTS

| | | |
|---|---|---|
| JP | 09/170533 | 6/1997 |
| JP | 2001-352800 | 12/2001 |
| JP | 2004-340010 | 12/2004 |
| JP | 2005-264762 | 9/2005 |
| JP | 2006-081324 | 3/2006 |

* cited by examiner

*Primary Examiner*—Hau V Phan
(74) *Attorney, Agent, or Firm*—Kenyon & Kenyon LLP

(57) ABSTRACT

When a shift lever is in a parking position, a rotation restriction index Jm2 is set based on a drive state of an engine or a first motor (S130, S160, S240, and S290). A current value based on the rotation restriction index Jm2 is set to a current command of the d axis in an electric angle when motoring of the engine in a stop state is started and a second motor is controlled such that the magnetic field direction of a stator of the second motor is fixed. This method can appropriately prevent a power shaft from rotating.

9 Claims, 10 Drawing Sheets

VEHICLE AND ITS CONTROL METHOD

BACKGROUND

1. Technical Field

The present invention relates to a vehicle and its control method.

2. Related Art

Conventionally there has been proposed such a vehicle including: an engine; a planetary gear unit which includes a carrier connected to the engine, and a ring gear connected to a drive wheel via a multistage automatic transmission section; a first electric motor connected to a sun gear of the planetary gear unit; and a second electric motor connected to a ring gear of the planetary gear unit (for example, see Patent Document 1). This vehicle starts the engine by motoring i.e., by rotating the first electric motor and the second electric motor in the same direction while the vehicle is being stopped with the operational engagement between the drive wheel and the ring gear being released by the multistage automatic transmission section.

Patent Document 1: Japanese Patent Laid-Open No. 2005-264762

SUMMARY

It should be noted that when a shift lever is changed from a parking position to a running position, the transmission connects the ring gear and the drive wheel, thereby generating a shock; the first electric motor is used for motoring the engine to operate, start, or stop the engine, thereby applying a torque to the ring gear. It may be preferable to provide a control with as little rotation as possible of the ring gear to absorb a shock generated or a torque applied.

A vehicle and its control method in accordance with the present invention includes a transmission which transmits a mechanical power accompanying a change of gears between a power shaft and an axle side and releases the connection between the power shaft and the axle side. The power is output from a mechanical power source and an electric motor to the power shaft. And an object of the present invention is to prevent the power shaft from rotating when the shift lever is in the parking position.

To accomplish the aforementioned object, the vehicle and its control method in accordance with the present invention employs the following.

The present invention is directed to a vehicle. The vehicle includes: a mechanical power source capable of outputting a mechanical power to a power shaft; an electric motor which has a rotor connected to the power shaft, and causes the rotor to rotate with a rotating magnetic field of a stator to input and output the mechanical power to and from the power shaft; a accumulator capable of sending and receiving an electric power to and from at least the electric motor; a transmission capable of transmitting the mechanical power accompanying a change of gears between the power shaft and an axle side, and releasing the connection between the power shaft and the axle side; and a control module of controlling the electric motor such that when a shift lever is in a parking position, a magnetic field direction of the stator is fixed based on a drive state of the mechanical power source to limit the rotation of the rotor.

According to the vehicle of the present invention, when the shift lever is in the parking position, an electric motor is controlled such that the magnetic field direction of the stator of the electric motor is fixed based on a drive state of a mechanical power source to limit the rotation of the rotor of the electric motor. When the shift lever is in the parking position, a fixing module such as a parking lock mechanism fixes the axle and a transmission releases the power shaft from the axle side so as not to supply a mechanical power from the power shaft side to the axle side. It may be preferable to provide a control with as little rotation as possible to absorb a shock generated when the shift lever is changed from the parking position to the running position and the transmission module connects the power shaft side and the axle side. According to the vehicle of the present invention, when the shift lever is in the parking position, the magnetic field direction of the stator of the electric motor is fixed to limit the rotation of the rotor of the electric motor, thereby preventing the power shaft from rotating. Further, since the rotation of the rotor of the electric motor is limited based on the drive state of the mechanical power source, the rotation of the power shaft is more appropriately prevented in comparison with vehicles in which the driving state of a mechanical power source is not considered.

In one preferable embodiment of the vehicle of the invention, the mechanical power source may include an internal combustion engine and an electric power-mechanical power input output structure which is connected to an output shaft of the internal combustion engine and the power shaft, can send and receive an electric power to and from the accumulator, and outputs at least a part of a mechanical power from the internal combustion engine accompanying an input and output of the electric power and the mechanical power to the power shaft; and the control module may perform control so as to limit the rotation of the rotor by fixing a magnetic field direction of the stator based on at least one of a drive state of the internal combustion engine and a drive state of the electric power-mechanical power input output structure. In this embodiment, the rotor of the electric motor can be prevented from rotating based on a drive state of the internal combustion engine and the electric power-mechanical power input output structure.

In another preferable embodiment of the vehicle of the invention whose mechanical power source includes an internal combustion engine and an electric power-mechanical power input output structure, the control module may use the electric power-mechanical power input output structure to perform control so as to prevent the rotor from rotating by setting a first index as a rotation restriction index when the internal combustion engine is motoring to start or stop the internal combustion engine; by setting a second index other than the first index as the rotation restriction index when the internal combustion engine is operating; and by fixing the magnetic field direction of the stator based on the set rotation restriction index. In this embodiment, the rotor of the electric motor can be prevented from rotating depending on whether the internal combustion engine is motoring or operating. In this case, the control module may set a third index other than the first index as the rotation restriction index when a drive state of the electric power-mechanical power input output structure is a predetermined drive state and when the internal combustion engine is motoring by the electric power-mechanical power input output structure to start or stop the internal combustion engine. In this embodiment, when the internal combustion engine is motoring, the rotor of the electric motor can be prevented from rotating depending on whether or not the drive state of the electric power-mechanical power input output structure is a predetermined drive state. Here, the "predetermined drive state" includes a state in which a drive power which is input or output by the electric power-mechanical power input output structure is equal to or less than the predetermined drive power. Also, the control module may perform control so as to prevent the rotor from rotating by applying current based on the set rotation restriction index to the electric motor to fix the magnetic field direction of the stator. In this embodiment, the rotor of the electric motor can be prevented from rotating by applying current based on a rotation restriction index to the electric motor.

In still another preferable embodiment of the vehicle of the invention whose mechanical power source includes an internal combustion engine and an electric power-mechanical power input output structure, the electric power-mechanical power input output structure may include: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

In still another preferable embodiment of the vehicle of the invention, the vehicle may include a rotational position detecting module for detecting a rotational position of a rotor of the electric motor, and a control rotational position setting module for setting a control rotational position based on the detected rotational position. The control module may perform control so as to limit the rotation of the rotor by fixing the magnetic field direction of the stator using the set control rotational position. In this embodiment, the rotor of the electric motor can be prevented from rotating by using a control rotational position. In this case, the electric motor may be a three-phase alternating-current motor, and the control module may perform control so as to limit the rotation of the rotor by calculating currents of the d and q axes by performing a three-phase to two-phase conversion on the current applied to each phase of the electric motor using the set control rotational position; by setting a target current of the d axis in the control rotational position based on a drive state of the mechanical power source; by setting a value 0 to the target current of the q axis in the control rotational position; and by fixing the magnetic field direction of the stator based on the set target currents of the d and q axes and the calculated currents of the d and q axes. In this embodiment, the rotor of the electric motor can be prevented from rotating by using a d axial target current in the control rotational position based on a drive state of the mechanical power source.

The present invention is also directed to a method of controlling a vehicle. The vehicle includes: a mechanical power source capable of outputting a mechanical power to a power shaft; an electric motor which includes a rotor connected to the power shaft, causes the rotor to rotate with a rotating magnetic field of a stator to input and output the mechanical power to and from the power shaft; a accumulator capable of sending and receiving an electric power to and from at least the electric motor; a transmission capable of transmitting the mechanical power accompanying a change of gears between the power shaft and an axle side, and releasing the connection between the power shaft and the axle side. The method includes controlling the electric motor so as to limit the rotation of the rotor by fixing the magnetic field direction of the stator based on a drive state of the mechanical power source when a shift lever is in a parking position.

According to the method of controlling a vehicle of the present invention, when the shift lever is in the parking position, an electric motor is controlled such that the magnetic field direction of the stator of the electric motor is fixed based on a drive state of a mechanical power source to limit the rotation of the rotor of the electric motor. When the shift lever is in the parking position, a fixing module such as a parking lock mechanism fixes the axle and a transmission releases the power shaft from the axle side so as not to supply a mechanical power from the power shaft side to the axle side. It may be preferable to provide a control with as little rotation as possible to absorb a shock generated when the shift lever is changed from the parking position to the running position and the transmission module connects the power shaft side and the axle side. According to the vehicle of the present invention, when the shift lever is in the parking position, the magnetic field direction of the stator of the electric motor is fixed to limit the rotation of the rotor of the electric motor, thereby preventing the power shaft from rotating. Further, since the rotation of the rotor of the electric motor is limited based on the drive state of the mechanical power source, the rotation of the power shaft is more appropriately prevented in comparison with vehicles in which the driving state of a mechanical power source is not considered.

In one preferable embodiment of the method of controlling a vehicle of the present invention, the mechanical power source may include an internal combustion engine and an electric power-mechanical power input output structure which is connected to an output shaft of the internal combustion engine and the power shaft, can send and receive an electric power to and from the accumulator, and outputs at least a part of a mechanical power from the internal combustion engine accompanying an input and output of the electric power and the mechanical power to the power shaft; and the method may perform control so as to limit the rotation of the rotor by fixing a magnetic field direction of the stator based on at least one of a drive state of the internal combustion engine and a drive state of the electric power-mechanical power input output structure. In this embodiment, the rotor of the electric motor can be prevented from rotating based on a drive state of the internal combustion engine and the electric power-mechanical power input output structure.

In another preferable embodiment of the method of controlling a vehicle of the present invention whose mechanical power source includes an internal combustion engine and an electric power-mechanical power input output structure, the method may use the electric power-mechanical power input output structure to perform control so as to prevent the rotor from rotating by setting a first index as a rotation restriction index when the internal combustion engine is motoring to start or stop the internal combustion engine; by setting a second index other than the first index as the rotation restriction index when the internal combustion engine is operating; and by fixing the magnetic field direction of the stator based on the set rotation restriction index. In this embodiment, the rotor of the electric motor can be prevented from rotating depending on whether the internal combustion engine is motoring or operating. In this case, the method may set a third index other than the first index as the rotation restriction index when a drive state of the electric power-mechanical power input output structure is a predetermined drive state and when the internal combustion engine is motoring by the electric power-mechanical power input output structure to start or stop the internal combustion engine. In this embodiment, when the internal combustion engine is motoring, the rotor of the electric motor can be prevented from rotating depending on whether or not the drive state of the electric power-mechanical power input output structure is a predetermined drive state. Here, the "predetermined drive state" includes a state in which a drive power which is input or output by the electric power-mechanical power input output structure is equal to or less than the predetermined drive power. Also, the method may perform control so as to prevent the rotor from rotating by applying current based on the set rotation restriction index to the electric motor to fix the magnetic field direction of the stator. In this embodiment, the rotor of the electric motor can be prevented from rotating by applying current based on a rotation restriction index to the electric motor.

DESCRIPTION OF THE PREFERRED EMBODIMENTS

Figure 1:
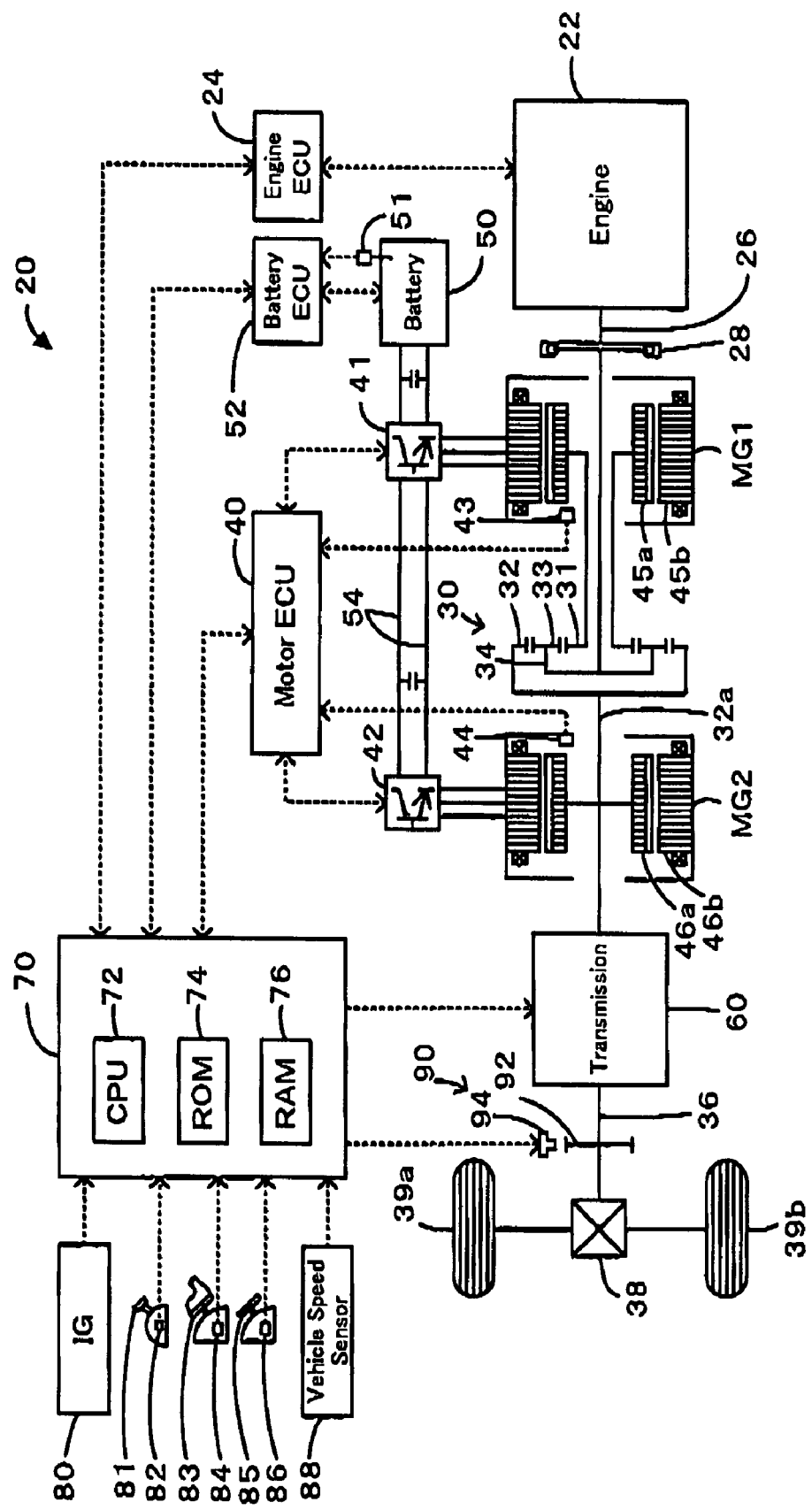
FIG. 1 is a block diagram showing a schematic configuration of a hybrid vehicle 20 in accordance with an embodiment of the present invention.

Next, the best mode for carrying out the present invention will be described by using embodiments. FIG. 1 is a block diagram showing a schematic configuration of a hybrid vehicle 20 as an embodiment of the present invention. The hybrid vehicle 20 in accordance with an embodiment of the present invention, as shown in the figure, includes: an engine 22; a three shaft-type power distribution integration mechanism 30 connected via a damper 28 to a crankshaft 26 serving as an output shaft of the engine 22; a generatable motor MG1 connected to the power distribution integration mechanism 30; a motor MG2 connected to a ring gear shaft 32a serving as a drive shaft connected to the power distribution integration mechanism 30; a transmission 60 which changes the speed of a mechanical power of the ring gear shaft 32a and outputs the mechanical power to a drive shaft 36 coupled to drive wheels 39a and 39b; a parking lock mechanism 90 for locking the drive wheels 39a and 39b; and a hybrid electronic control unit 70 for controlling the entire vehicle.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution integration mechanism 30 are respectively coupled with the crankshaft 26 of the engine 22, the motor MG1, and the ring gear shaft 32a or the power shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the transmission 60, the drive shaft 36 and the differential gear 38 from ring gear shaft 32a.

Figure 2:
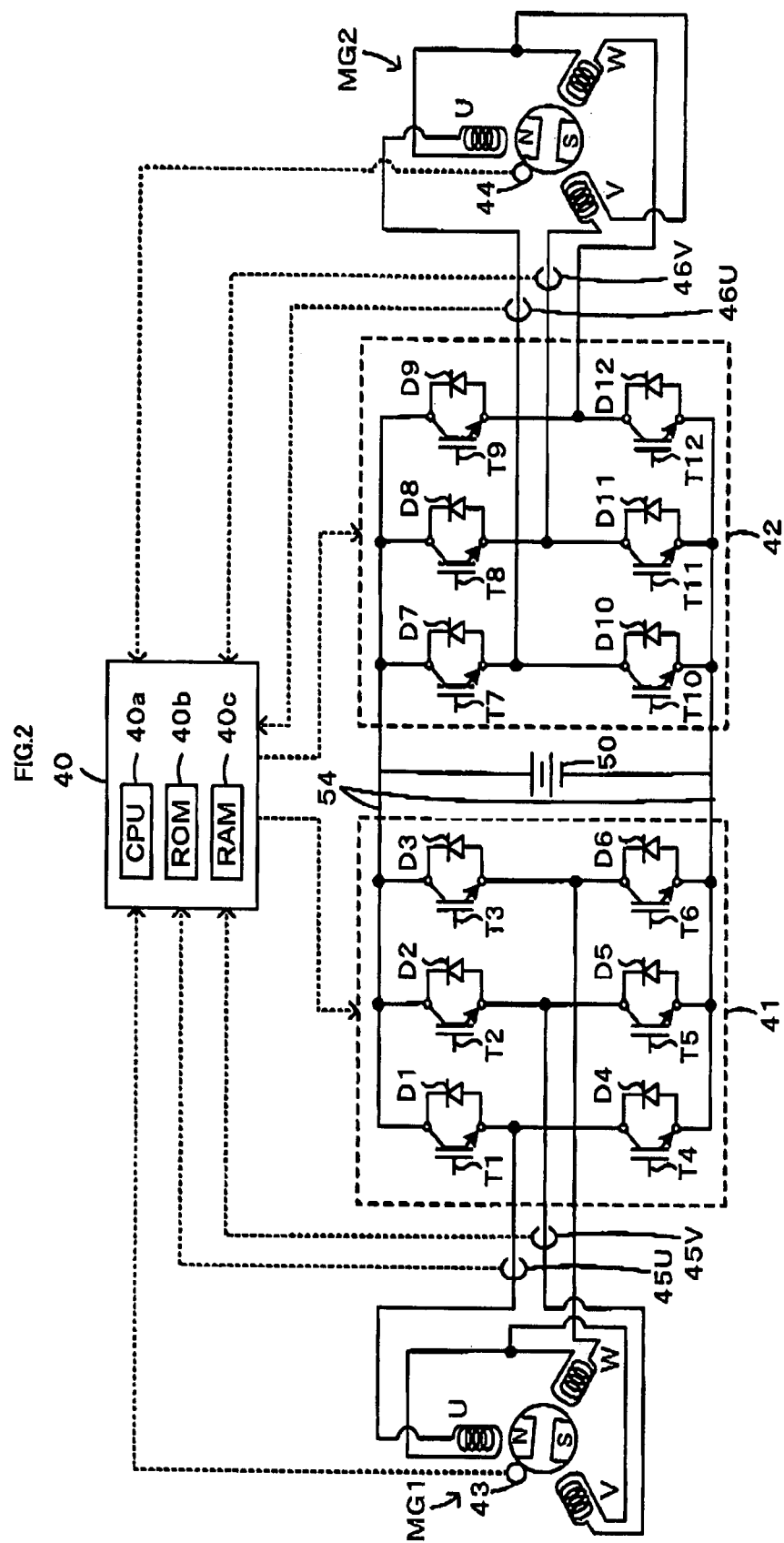
FIG. 2 is a block diagram showing a schematic configuration of an electric drive system centered on motors MG1 and MG2.

FIG. 2 is a block diagram showing a schematic configuration of an electric drive system centered on motors MG1 and MG2. As shown in FIGS. 1 and 2, each of the motors MG1 and MG2 includes rotors 45a and 46a to which a permanent magnet is attached and stators 45b and 46b around which a three-phase coil is wound. The motors MG1 and MG2 are configured as a well-known synchronous motor generator which serves not only as a generator but also a motor. The motors MG1 and MG2 send and receive an electric power via inverters 41 and 42 to and from a battery 50. The inverter 41 consists of six transistors T1 to T6 and six back-to-back connected diodes D1 to D6; the inverter 42 consists of six transistors T7 to T12 and six back-to-back connected diodes D7 to D12. Each of the six transistors T1 to T6 and six transistors T7 to T12 are connected in pairs. One of the paired transistors is connected to a positive electrode bus line serving as a source side to which a positive electrode of the battery 50 is connected while the other is connected to a negative electrode bus line serving as a sink side to which a negative electrode of the battery 50 is connected. Each one of the three-phase coils (a U-phase coil, a V-phase coil and a W-phase coil) of the motors MG1 and MG2 is connected to a connection point between the source side and the sink side. Accordingly, a magnetic field can be formed in a three-phase coil by adjusting the on-time period of the paired transistors T1 to T 6, and T7 to T12 so that the motors MG1 and MG2 can be rotatably driven. An power line 54 connecting the inverters 41 and 42 to the battery 50 is configured as a positive electrode bus line and a negative electrode bus line to be shared by each of the inverters 41 and 42 so that an electric power generated by either one of the motors MG1 and MG2 may be consumed by the other motor. Accordingly, the battery 50 is charged or discharged depending on a supply or shortage of the electric power caused by either one of the motors MG1 and MG2. It should be noted that if the balance between generation and consumption of the electric power is maintained, the battery 50 is not charged or discharged. Each of the motors MG1 and MG2 is drive-controlled by a motor electronic control unit (hereinafter referred to as a motor ECU) 40. The motor ECU 40 is configured as a microprocessor centered on a CPU 40a. In addition to the CPU 40a, the motor ECU 40 also includes a ROM 40b for storing a processing program, a RAM 40c for temporally storing data, an input-output port (not shown), and a communication port (not shown). The motor ECU 40 receives signals necessary for drive-controlling the motors MG1 and MG2. Such signals include θm1, θm2, etc, each of which indicates a rotational position of the rotors 45a and 46a of the motors MG1 and MG2, and which are sent by a rotational position detection sensors 43 and 44 which detect the rotational position of a rotor of the motors MG1 and MG2. Such signals also include Iu1, Iv1, Iu2, Iv2, etc, indicating a phase current, each of which is sent by current sensors 45U, 45V, 46U, and 46V which detect a phase current passed to a U phase and a V phase of a three-phase coil of the motors MG1 and MG2. The motor ECU 40 outputs a switching signal to transistors T1 to T6 and T7 to T12 of the inverters 41 and 42. The motor ECU 40 communicates with the hybrid ECU 70 to drive-control the motors MG1 and MG2 based on the control signal received from the hybrid ECU 70, and when necessary, output data related to an operational state of the motors MG1 and MG2 to the hybrid ECU 70.

A transmission 60 includes a brake and a clutch (not shown), and configured to be able to connect and disconnect a ring gear shaft 32a serving as a power shaft and a drive shaft 36, and change the rotation speed of the ring gear shaft 32a to one of the four speeds to be transmitted to the drive shaft 36.

A parking lock mechanism 90 includes a parking gear 92 attached to a drive shaft 36, and a parking lock pole 94 which engages and locks the parking gear 92 to stop its rotation. The parking lock pole 94 is operated by an actuator (not shown) which is drive-controlled by the hybrid ECU 70 which receives an actuating signal indicating a shift from a range to the P range or an actuating signal indicating a shift from the P range to another range. The parking lock pole 94 performs a parking lock and releases the parking lock by engaging the parking gear 92 and releasing its engagement. Since the drive shaft 36 is mechanically connected to drive wheels 39a and 39b, the parking lock mechanism 90 indirectly serves to lock the drive wheels 39a and 39b.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid ECU 70 is configured as a microprocessor centered on a CPU 72. In addition to the CPU 72, the hybrid ECU 70 also includes a ROM 74 for storing a processing program, a RAM 76 for temporally storing data, an input-output port (not shown), and a communication port (not shown). The hybrid ECU 70 receives an ignition signal from an ignition switch 80, a shift position SP from a shift position sensor 82 which detects a shift position of a shift lever 81, an accelerator opening Acc from an accelerator pedal position sensor 84 which detects the amount of depression of an accelerator pedal 83, a brake pedal position BP from an brake pedal position sensor 86 which detects the amount of depression of a brake pedal 85, and a vehicle speed V from a vehicle speed sensor 88 via an input port. The hybrid ECU 70 outputs a drive signal to an actuator (not shown) of a brake and a clutch of the transmission 60, and a drive signal to an actuator (not shown) of the parking lock mechanism 90 via an output port. The hybrid ECU 70 is connected to an engine ECU 24, a motor ECU 40, and a battery ECU 52 via a communication port to send and receive various control signals and data to and from the engine ECU 24, the motor ECU 40, and the battery ECU 52.

It should be noted that according to the vehicle 20 in accordance with an embodiment, there is provided a parking position (P position), a neutral position (N position), a drive position (D position) and a reverse position (R position) as a position of a shift lever 81 which is detected by a shift position sensor 82. When the shift lever 81 is placed in the parking position, a brake and a clutch (not shown) of the transmission 60 are normally opened and the ring gear shaft 32a serving as a power shaft is disconnected from the drive shaft 36.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Next, the operation of the above configured embodiment of the hybrid vehicle 20, more specifically, its operation when the shift lever 81 is in the parking position will be described.

Figure 3:
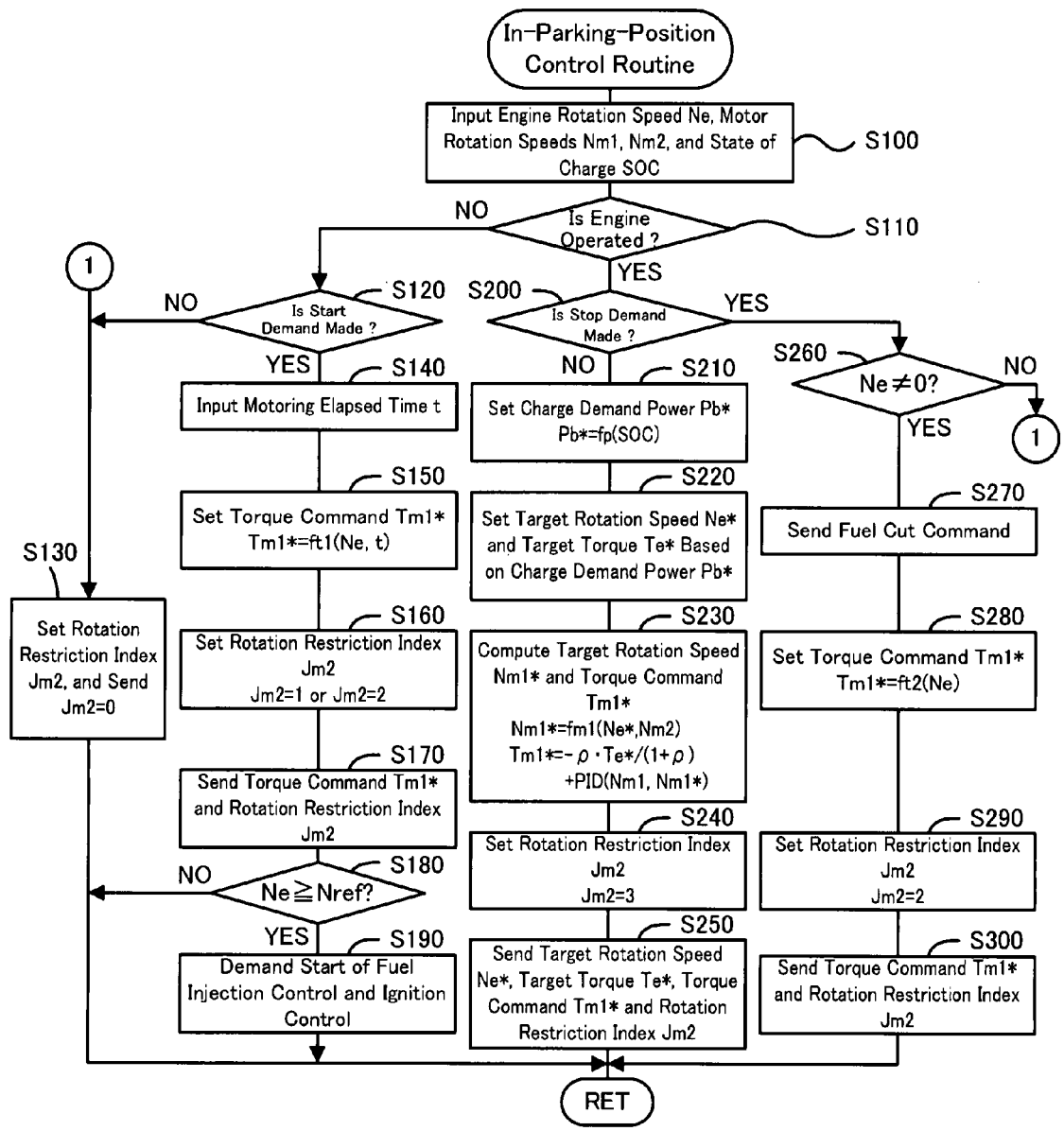
FIG. 3 is a flowchart showing an example of an in-parking-position control routine which is executed by a hybrid electronic control unit (ECU) 70 in accordance with an embodiment of the present invention.

FIG. 3 is a flowchart showing an example of an in-parking-position control routine which is executed by a hybrid ECU 70. This routine is repeatedly executed in a predetermined time interval (for example, in several msec) when the shift lever 81 is placed in the parking position.

When the in-parking-position control routine is executed, first, the CPU 72 of the hybrid ECU 70 enters data necessary for control, such as a rotation speed Ne of the engine 22, rotation speeds Nm1 and Nm2 of the motors MG1 and MG2, a state of charge (SOC) of the battery 50, and the like (step S100). Here, the rotation speed Ne of the engine 22 is calculated based on a signal from a crank position sensor (not shown) attached to the crankshaft 26 and the data is entered from the engine ECU 24 through communication. The rotation speeds Nm1 and Nm2 of the motors MG1 and MG2 is calculated based on the rotation positions θm1 and θm2 of the rotors 45a and 46a of the motors MG1 and MG2 which are detected by the rotational position detection sensors 43 and 44, and the data is entered from the motor ECU 40 through communication. The state of charge (SOC) of the battery 50 is calculated based on the integrated value of a charge and discharge current detected by a current sensor (not shown), and the data is entered from the battery ECU 52 through communication.

Figure 4:
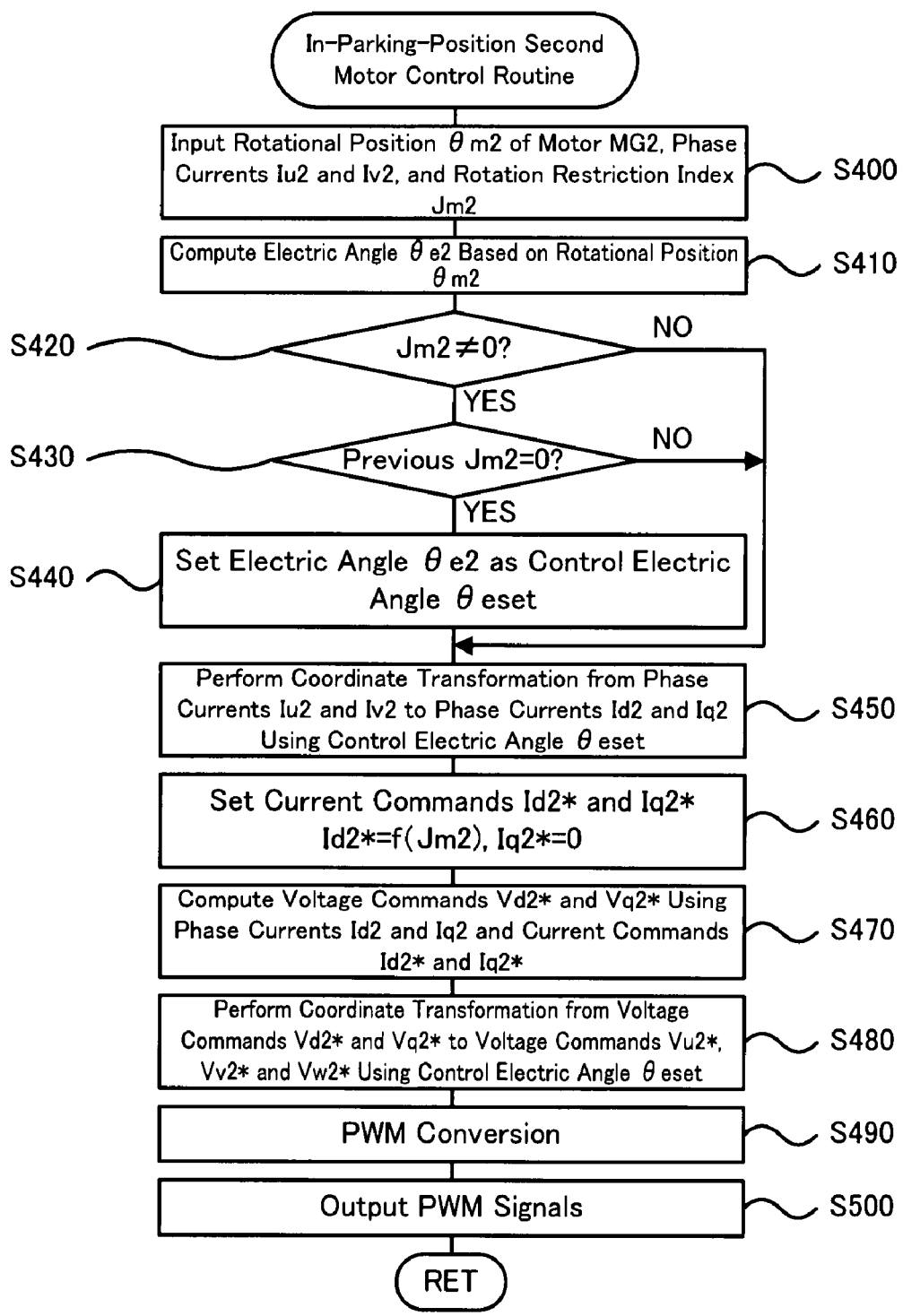
FIG. 4 is a flowchart showing an example of an in-parking-position second motor control routine which is executed by a motor ECU 40 in accordance with an embodiment of the present invention.

Next, the routine judges whether or not the engine 22 is operated (step S110). If a judgment is made that the engine 22 is not operated, the routine judges whether or not a start demand is made on the engine 22 (step S120). Here, a judgment as to whether or not the engine 22 is operated can be made by checking a flag value which is entered from the engine ECU 24 through communication, and which is set depending on whether or not the engine 22 is operated. Again, the judgment as to whether or not a start demand is made on the engine 22 can be made by checking whether or not the state of charge (SOC) of the battery 50 is less than a predetermined state of charge Sref1 (such as 30% and 40%). If a judgment is made that the engine 22 is not operated and a start demand is not made, the routine judges that the engine 22 is stopped, and sets a value 0 to a rotation restriction index Jm2, and sends the data to the motor ECU 40 (step S130). Then the in-parking-position control routine terminates processing. Here, the rotation restriction index Jm2 is an index which is used to control the motor MG2. When the value of the index is other than value 0 (value 1, 2, or 3 in this embodiment as described later), the magnetic field direction of the stator 46b of the motor MG2 is fixed so as not to rotate the rotor 46a (ring gear shaft 32a serving as a power shaft) of the motor MG2. When the motor ECU 40 receives the rotation restriction index Jm2, an in-parking-position second motor control routine is executed as shown in FIG. 4. The routine performs a switching control of transistors T7 to T12 of the inverter 42 of the motor MG2 based on the rotation restriction index Jm2. It should be noted that the rotation restriction index Jm2 and the in-parking-position second motor control routine shown in FIG. 4 will be described in detail later.

Figure 5:
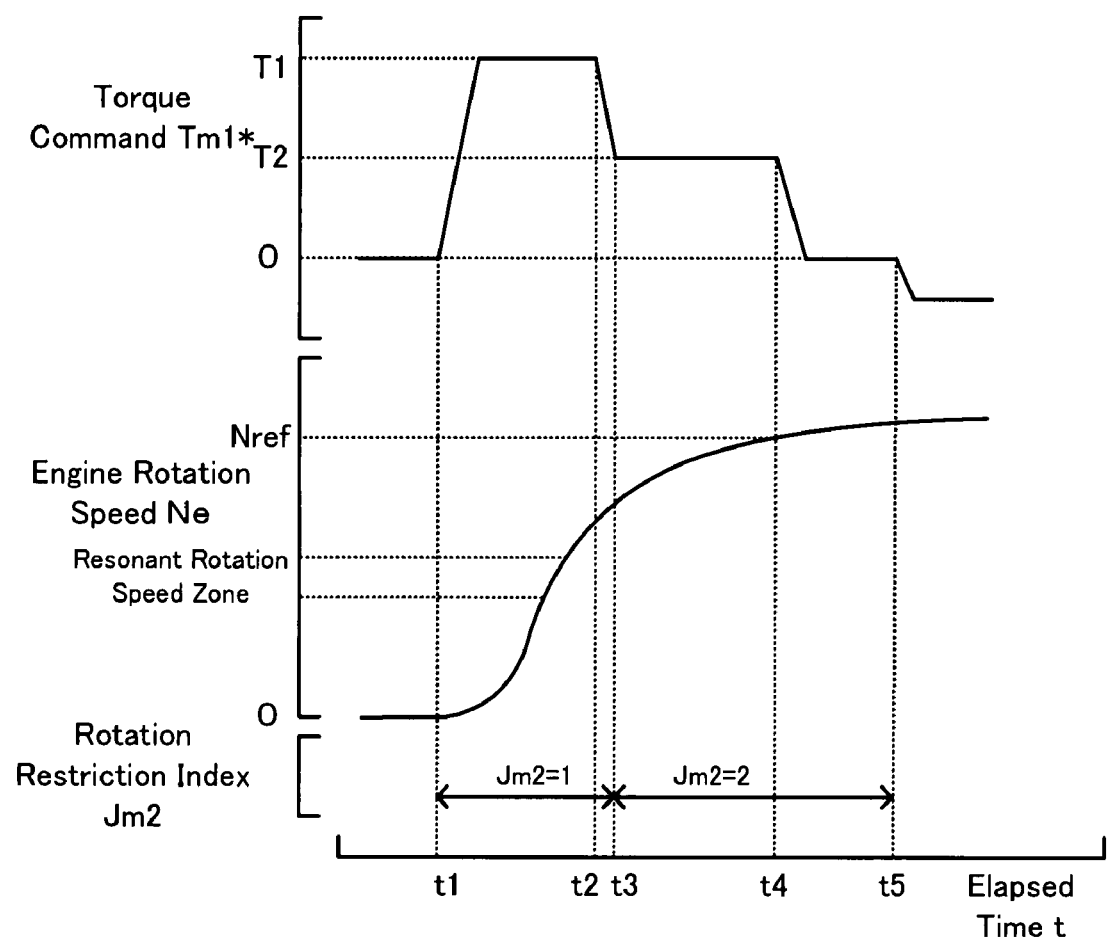
FIG. 5 is an explanatory drawing showing an example of a torque command setting map.

When a judgment is made at step S120 that the start demand of the engine 22 has been made, the routine enters a motoring elapsed time t (step S140), and then sets a torque command Tm1* of the motor MG1 (step S150) using the motoring elapsed time t entered at S140 and the rotation speed Ne of the engine 22 entered at S100. Here, the routine is configured to receive the motoring elapsed time t from a timer (not shown) which measures a time period elapsed from the time when the motoring of the engine 22 started. In this embodiment, a relation among the rotation speed Ne of the engine 22, the motoring elapsed time t, and the torque command Tm1* of the motor MG1 has been determined and stored as a torque command setting map. When the rotation speed Ne of the engine 22 and the motoring elapsed time t is received, the torque command Tm1* is configured to be set by deriving the corresponding torque command Tm1* from the map that has been stored. FIG. 5 shows an example of the torque command setting map. FIG. 5 also shows a rotation restriction index Jm2 described later. With reference to the torque command setting map as shown in the figure, immediately after the time t1 when the start demand is made on the engine 22, a rate processing is used to promptly increase to a relatively large predetermined torque T1 which is set to the torque command Tm1* to promptly increase the rotation speed Ne of the engine 22. Then, during the period from the time t2 after the rotation speed Ne of the engine 22 passed a resonant rotation speed zone or after the time required to pass the resonant rotation speed zone elapsed, to the time t3, a rate processing is used to decrease to a predetermined torque T2 so as to be able to provide more than the predetermined Nref enough to stably rotate the engine 22. The torque is set to the torque command Tm1*. After the time t3, a predetermined torque T2 is set to the torque command Tm1* to decrease the electric power consumption and minimize a reactive force of the ring gear shaft 32a serving as a power shaft. Here, a predetermined rotation speed Nref is a rotation speed for starting a fuel injection control and an ignition control. In this embodiment, a rotation speed which is greater enough than the resonant rotation speed zone is set. Then, at the time t4 when the rotation speed Ne of the engine 22 reached the predetermined rotation speed Nref, a rate processing is used to promptly set a value 0 to the torque command Tm1*. Then the routine terminates at the time t5 when the start of the engine 22 is completed. As described above, immediately after a start demand of the engine 22 was made, a large torque is set to the torque command Tm1* of the motor MG1 to promptly rotate the engine 22 at more than a predetermined rotation speed Nref.

Figure 6:
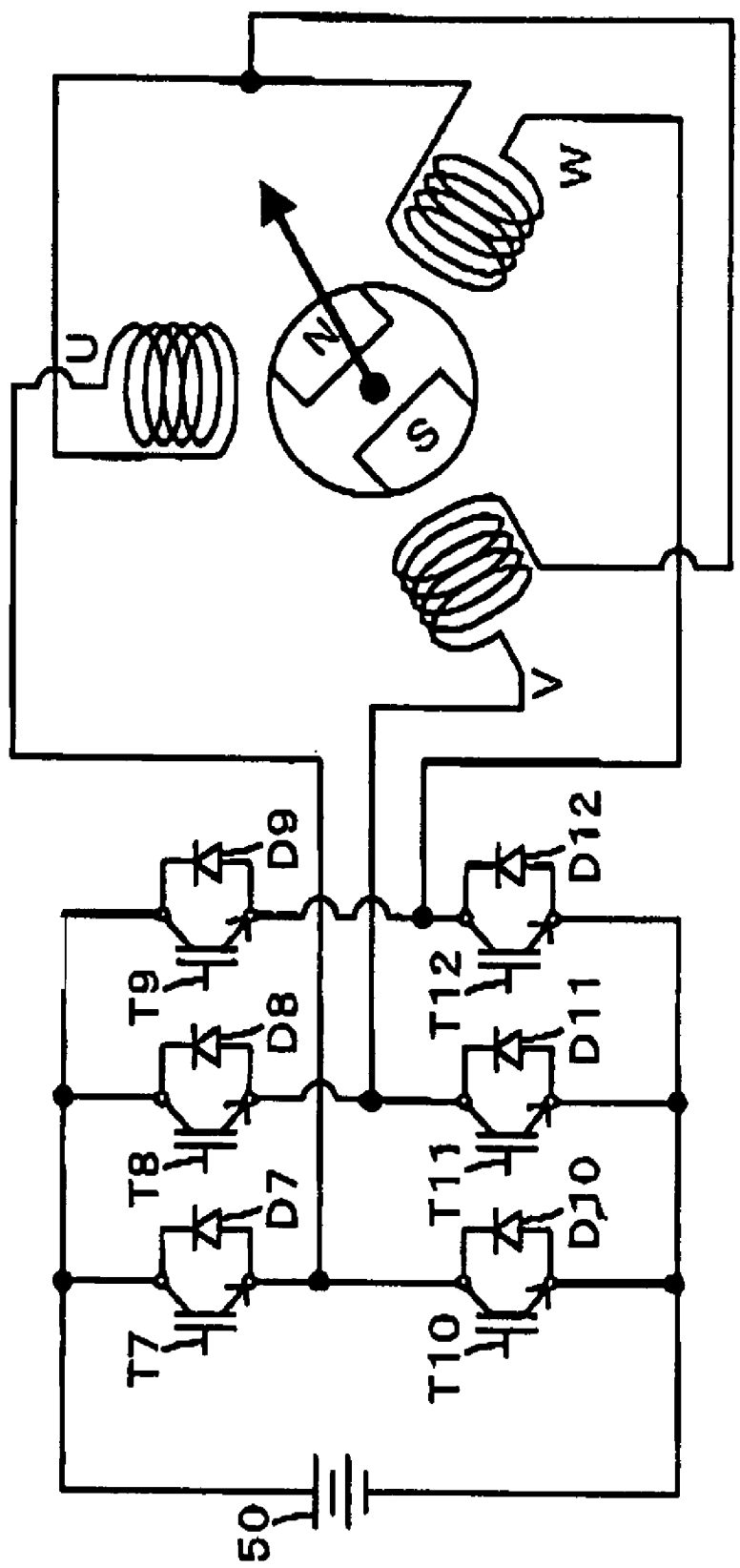
FIG. 6 is an explanatory drawing showing an example of a state in which the magnetic field direction of a stator 46b of a motor MG2 is fixed to prevent a rotor 46a from rotating.

Next, the routine sets a value 1 or 2 to the rotation restriction index Jm2 (step S160), and then sends the torque command Tm1* of the motor MG1 and the rotation restriction index Jm2 to the motor ECU 40 (step S170). Here, in this embodiment as shown in FIG. 5, a value 1 is set to the rotation restriction index Jm2 during the time period from the time t1 when motoring of the engine 22 starts until the time t3 when a predetermined torque T2 is set to the torque command Tm1* of the motor MG1, and a value 2 is set to the rotation restriction index Jm2 during the time period from the time t3 until the time t5 when the starting of the engine 22 is completed. When the motor ECU 40 receives a torque command Tm1* of the motor MG1 and a rotation restriction index Jm2, a first motor control routine (not shown) performs a switching control of the transistors T1 to T6 of the inverter 41 so as to drive the motor MG1 in response to the torque command Tm1*, and the in-parking-position second motor control routine shown in FIG. 4 performs a switching control of the transistors T7 to T12 of the inverter 42 based on the rotation restriction index Jm2 to fix the magnetic field direction of the stator 46b so as not to rotate the rotor 46a (ring gear shaft 32a serving as a power shaft) of the motor MG2 when the rotation restriction index Jm2 does not contain a value 0. Here, FIG. 6 shows an example of a state in which the magnetic field direction of the stator 46b is fixed not to rotate the rotor 46a of the motor MG2. In FIG. 6, current is applied to a U-phase coil, a V-phase coil and a W-phase coil of the stator 46b to form a synthetic magnetic field (shown in a solid arrow in the figure). In this embodiment, the motor MG2 is controlled such that this synthetic magnetic field does not rotate. Hereinafter this synthetic magnetic field which is fixed not to be rotated will be referred to as a fixed magnetic field. When the fixed magnetic field direction matches the magnetic flux direction (direction of the d axis of the d-q coordinate) formed by a permanent magnet of the rotor 46a of the motor MG2, torque is not output from the motor MG2 to the ring gear shaft 32a. It should be noted that there are a torque which is output from the motor MG1 and applied to the ring gear shaft 32a together with another torque via the power distribution integration mechanism 30 when the engine 22 is operated, and a torque which is output from the motor MG1 and applied to the ring gear shaft 32a when the engine 22 is motoring (hereinafter, these torques are referred to as applied torques). When the rotor 46a of the motor MG2 is rotated by these applied torques, and if the fixed magnetic field direction formed in the stator 46b does not match the direction of the present d axis, a torque is applied to the rotor 46a so that the fixed magnetic field direction formed in the stator 46b may match the direction of the present d axis (hereinafter this torque is referred to as an absorbed torque). Then, the rotor 46a will stop in a position equal to the fixed magnetic field direction formed in the stator 46b, in which the applied torque matches the absorbed torque. In this embodiment, the rotor 46a of the motor MG2 will not be rotated in this way. In the d-q coordinate system, the d axis indicates the direction of a magnetic flux formed by a permanent magnet attached to the rotor 46a, and the q axis indicates the direction with an electrical angle of $\pi/2$ in advance to the d axis.

Next, the routine judges whether or not the rotation speed Ne of the engine 22 reaches the predetermined rotation speed Nref (step S180). If the rotation speed Ne of the engine 22 has not reached the predetermined rotation speed Nref, the in-parking-position control routine terminates without doing anything. If the rotation speed Ne of the engine 22 has reached the predetermined rotation speed Nref, the in-parking-position control routine demands the engine ECU 24 to start the fuel injection control and the ignition control (step S190), and then terminates processing. In this way, when the a start demand is made on the engine 22, the magnetic field direction of the stator 46b of the motor MG2 is fixed not to rotate the rotor 46a and motors the engine 22. It should be noted that in this embodiment, ignition control is started when the rotation speed Ne of the engine 22 has reached the predetermined rotation speed Nref, but ignition control may be started when a cylinder determination is completed based on a signal from a crank position sensor (not shown) when motoring of the engine 22 is started.

Figure 7:
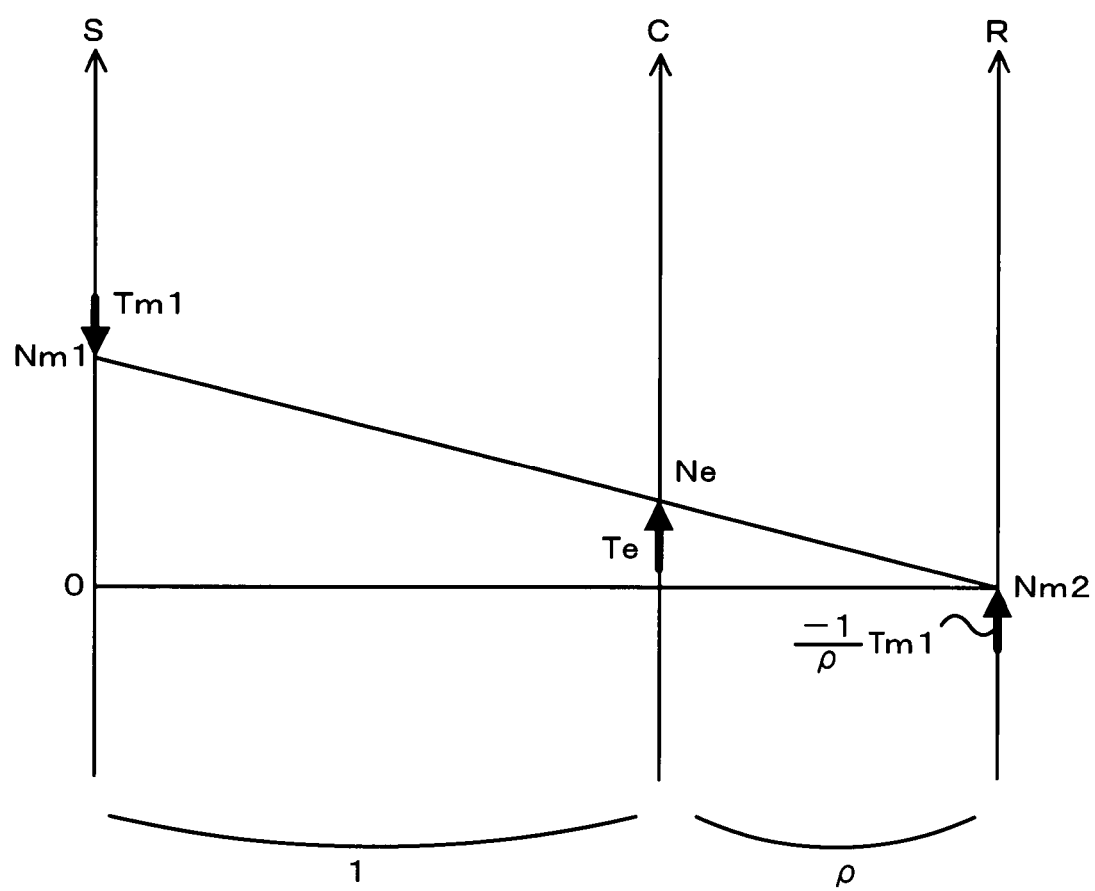
FIG. 7 is an explanatory drawing showing an example of an alignment chart for dynamically explaining a rotating element of a power distribution integration mechanism 30.

If the routine judges that the engine 22 has been driven (step S110), the routine judges whether or not a stop demand is made on the engine 22 (step S200). Here, this judgment as to whether or not a stop demand is made on the engine 22, for example, can be made by checking whether or not the state of charge (SOC) of the battery 50 exceeds a predetermined state of charge Sref2 (such as 60% and 70%). If the routine judges that a stop demand is not made on the engine 22, the routine sets a charge demand power Pb* to be charged to battery 50 based on the state of charge (SOC) (step S210), and then sets a target rotation speed Ne* and a target torque Te* of the engine 22 so as to output a power according to the set charge demand power Pb* from the engine 22 (step S220). Then, the routine uses the set target rotation speed Ne* of the engine 22 and a rotation speed Nm2 of the motor MG2 and a gear ratio $\rho$ of the power distribution integration mechanism 30 to compute the target rotation speed Nm1 of the motor MG1 based on the following formula (1), and uses the computed target rotation speed Nm1* and the present rotation speed Nm1 to compute the torque command Tm1* of the motor MG1 based on the following formula (2) (step S230), and then sets a value 3 to the rotation restriction index Jm2 (step S240). Here, the formula (1) is a dynamic relational expression of rotation elements of the power distribution integration mechanism 30. FIG. 7 is an alignment chart showing a dynamic relation between a rotation speed and a torque of the rotation elements of the power distribution integration mechanism 30. In the figure, the S axis at left indicates a rotation speed of the sun gear 31, i.e., rotation speed Nm1 of the motor MG1, the C axis at middle indicates a rotation speed of the carrier 34, i.e., rotation speed Ne of the engine 22, and the R axis at right indicates a rotation speed of the ring gear 32 (ring gear shaft 32a), i.e., rotation speed Nm2 of the motor MG2. It should be noted that the thick arrow on the R axis indicates a torque Te* which is output from the engine 22 and then is transmitted to the ring gear shaft 32a while the engine 22 is in steady operation at an operating point of a target rotation speed Ne* and target torque Te*. The formula (1) is easily derived from this alignment chart. Here, the Formula (2) is an equation for setting the torque command Tm1* of the motor MG1 as a sum of a torque for balancing a torque which is output from the engine 22 and is applied to the sun gear 31, and a torque for offsetting the difference between the target rotation speed Nm1* and the rotation speed Nm1 of the motor MG1. The first term on the right side of Formula (2) can be easily derived from the alignment chart of FIG. 7. The second and third terms on the right side are feedback control terms for rotating the motor MG1 by the target rotation speed Nm1*. The second term "k1" on the right side denotes a proportional gain; the third term "k2" on the right side denotes an integral gain.

[Formula 1]

$$Nm1^* = Ne^* \cdot (1 + \rho)/\rho - Nm2/\rho \quad (1)$$

$$Tm1^* = -\frac{\rho}{1+\rho} Te^* + k1(Nm1^* - Nm1) + k2 \int (Nm1^* - Nm1) dt \quad (2)$$

In this way, the in-parking-position control routine sets the target rotation speed Ne* and the target torque Te* of the engine 22, the torque command Tm1* of the motor MG1, and the rotation restriction index Jm2, and then the routine sends the target rotation speed Ne* and the target torque Te* of the engine 22 to the engine ECU 24, and also sends the torque command Tm1* of the motor MG1 and the rotation restriction index Jm2 to the motor ECU 40 (step S250). Then the in-parking-position control routine terminates processing. When the engine ECU 24 receives the target rotation speed Ne* and the target torque Te*, the engine ECU 24 performs the fuel injection control and the ignition control of the engine 22 so that the engine 22 may be operated at an operating point indicated by the target rotation speed Ne* and the target torque Te*. Since a value 3 is set to the rotation restriction index Jm2, the motor MG2 is controlled not to rotate the rotor 46a. In this case, the magnetic field direction of the stator 46b of the motor MG2 is fixed not to rotate the rotor 46a of the motor MG2, and an electric power is generated by the motor MG1 using power output from the engine 22.

Figure 8:
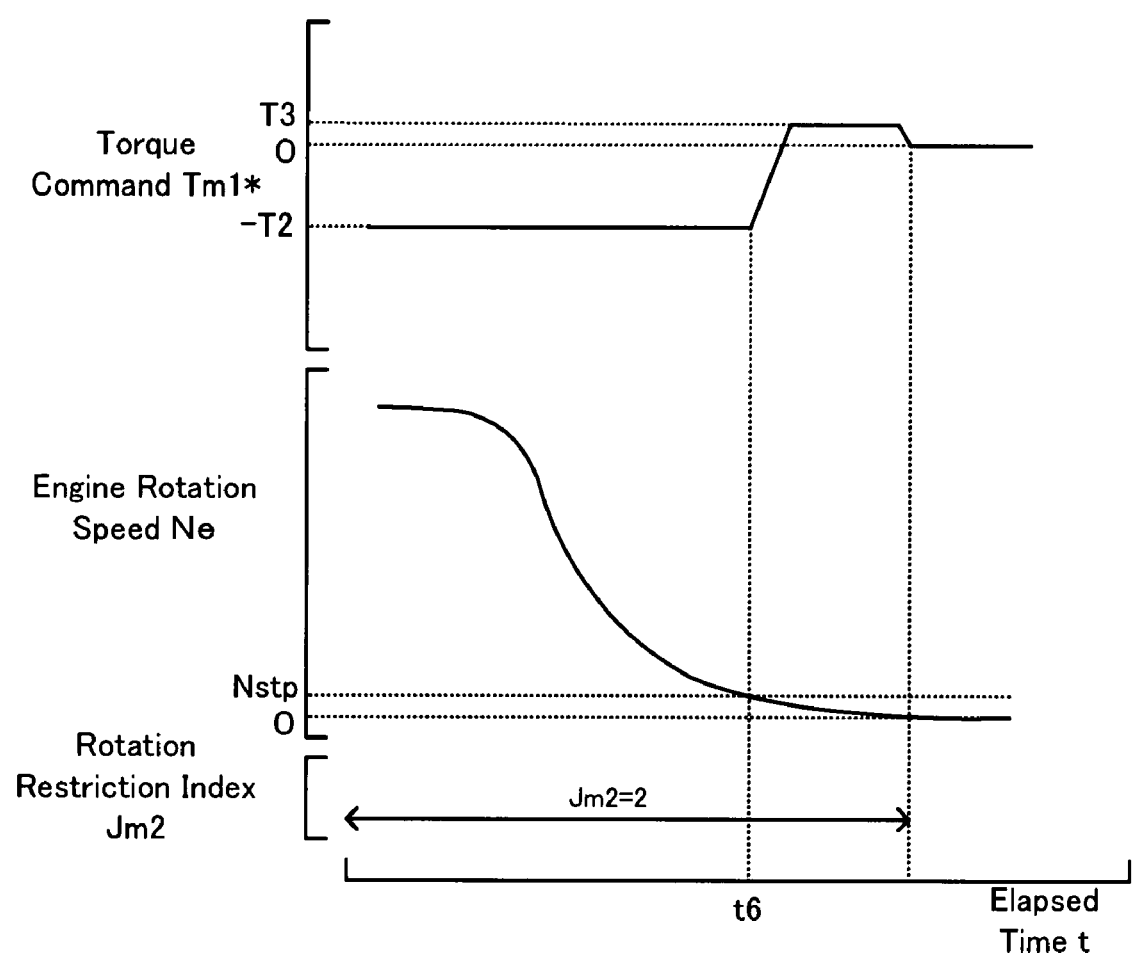
FIG. 8 is an explanatory drawing showing an example of a relation between a torque command Tm1* of a motor MG1 and a rotation speed Ne of an engine 22 when the engine 22 is stopped.

When a stop demand is made on the engine 22 at step S200, the routine checks the rotation speed Ne of the engine 22 (step S260). When the rotation speed Ne of the engine 22 is not 0, the routine judges that engine 22 has not stopped yet. Then, the routine sends a fuel cut command to the engine ECU 24 (step S270) and sets the torque command Tm1⁻ of the motor MG1 based on the rotation speed Ne of the engine 22 (step S280). When the fuel cut command is received, the engine ECU 24 controls a fuel injection valve (not shown) so as to stop the fuel injection to the engine 22. With reference to FIG. 8 showing an example of the relation between the torque command Tm1* of the motor MG1 and the rotation speed Ne of the engine 22, the torque command Tm1* in this embodiment receives a predetermined torque (−T2) for preventing the rotation of the engine 22 until the rotation speed Ne of the engine 22 reaches an immediately-before-stop rotation speed Nstp. At a timing (time t6) when the rotation speed Ne reaches the immediately-before-stop rotation speed Nstp, a torque holding a piston is changed to a predetermined torque T3 whose absolute value is smaller than the predetermined torque (−T2). It should be noted that the immediately-before-stop rotation speed Nstp is predetermined as a rotation speed immediately before the engine 22 is stopped. In this embodiment, an approximate angle between the compression strokes (for example, 180 degrees CA for a four-cylinder engine) is obtained by experiment and the rotation speed (such as 300 rpm) of the engine 22 is preset for stopping the rotation.

Then, the in-parking-position control routine sets a value 2 to the rotation restriction index Jm2 (step S290), sends the set torque command Tm1* of the motor MG1 and rotation restriction index Jm2 to the motor ECU 40 (step S300) and then terminates the in-parking-position control routine. Assuming that a value 2 is set to the rotation restriction index Jm2, the motor MG2 is controlled not to rotate the rotor 46a. In this way, when a stop demand is made on the engine 22, the magnetic field direction of the stator 46b of the motor MG2 is fixed not to rotate the rotor 46a and motors the engine 22. Then at step S260, if the routine judges that the rotation speed Ne of the engine 22 is a value 0, the routine judges that the engine 22 is stopped. Then the routine sets a value 0 to the rotation restriction index Jm2 and sends it to the motor ECU 40 (step S130), and then terminates the in-parking-position control routine.

In the foregoing, the in-parking-position control routine executed by the hybrid electronic control unit 70 has been described. Hereinafter, an in-parking-position second motor control routine executed by a motor ECU 40 will be described with reference to FIG. 4. This routine is executed repeatedly at a predetermined interval (such as in several msec) when the shift lever 81 is in the parking position. It should be noted that the routine in this embodiment checks a flag to judge whether or not the shift lever 81 is in the parking position. The flag is received via communication from the hybrid electronic control unit 70 which sets the flag based on a shift position SP received from the shift position sensor 82.

When the in-parking-position second motor control routine is executed, the CPU 40a of the motor ECU 40 receives a rotational position θm2 of the rotor 46a of the motor MG2 from the rotational position detection sensor 44, phase currents Iu2 and Iv2 supplied to a U phase coil and a V phase coil of a three-phase coil from the current sensors 46U, and 46V, and the rotation restriction index Jm2 (step S400). Then the routine computes an electric angle θe2 based on the rotational position θm2 of the rotor 46a of the motor MG2 (step S410). Here, the rotation restriction index Jm2 is set by the aforementioned in-parking-position control routine described in FIG. 3 and is received via communication from the hybrid electronic control unit 70. As described above, a value 0 is set to the rotation restriction index Jm2 when the engine 22 is stopped; a value 1 is set when a relatively large torque is output from the motor MG1 to start the engine 22; a value 2 is set when a torque output from the motor MG1 to start the engine 22 becomes equal to or smaller than a predetermined torque T2, or when a torque is output from the motor MG1 to stop the engine 22; and a value 3 is set when the engine 22 is operating.

Next, the routine checks the present and previous rotation restriction indexes Jm2 (previous Jm2) (steps S420 and S430). These steps S420 and S430 determine the time when the motoring of the engine 22 in a stop state started. If the value of the present rotation restriction index Jm2 is not 0, and the value of the previous rotation restriction index Jm2 (previous Jm2) is 0, the routine judges that it is the time when the motoring of the engine 22 in a stop state started. Thus the routine sets the electric angle θe2 to a control electric angle θeset (step S440). If the value of the present rotation restriction index Jm2 is 0, or the value of neither the present rotation restriction index Jm2 nor the previous rotation restriction index Jm2 (previous Jm2) is 0, the routine skips the step S440. Accordingly, the steps S420 to S440 are provided for a process of setting the electric angle θe2 to a control electric angle θeset when the value of the rotation restriction index Jm2 is changed from 0 to other than 0 (in this embodiment, a value 1, 2, or 3), i.e., when the motoring of the engine 22 in a stop state started.

Next, the routine sets a value 0 to the total sum of the phase currents Iu2, Iv2, and Iw2 supplied to a U phase, a V phase, and a W phase of a three-phase coil of the motor MG2, and then assigns a control electric angle θeset to the following Formula (3) to perform a coordinate transformation from the phase currents Iu2 and Iv2 to the currents Id2 and Iq2 of the d and q axes (3 phase to 2 phase transformation) (step S450). Next, the routine sets the current command Id2* of the d axis in the control electric angle θeset based on the rotation restriction index Jm2, and sets a value 0 to the current command Iq2* of the q axis (step S460). In this embodiment, a current capable of preventing the ring gear shaft 32a serving as a power shaft from rotating is set as the current command Id2* of the d axis based on the rotation restriction index Jm2. More specifically, in this embodiment, when the value of the rotation restriction index Jm2 is 0, a value 0 is set; when the value of the rotation restriction index Jm2 is 1, 2, or 3, a predetermined current I1, I2, or I3, each having a smaller value in this order, is set respectively as the current command Id2* of the d axis to prevent the ring gear shaft 32a from rotating. Here, the predetermined current I1 is determined as a current capable of preventing the ring gear shaft 32a serving as a power shaft from rotating even if a relatively higher torque (such as predetermined torque T1) is output from the motor MG1 to start engine 22, i.e., a relatively higher torque (such as predetermined torque (−T1/ρ)) is applied to the ring gear shaft 32a as the aforementioned applied torque; the predetermined current I2 is determined as a current capable of preventing the ring gear shaft 32a from rotating even if a torque having the absolute value not exceeding the predetermined torque T2 is output from the motor MG1 to start or stop the engine 22, i.e., a torque having the absolute value not exceeding the predetermined torque (T2/ρ) is applied to the ring gear shaft 32a as the applied torque; and the predetermined current I3 is determined as a current capable of preventing the ring gear shaft 32a from rotating even if the engine 22 is operated to output a maximum value Pbmax of a charge demand power Pb*, i.e., the corresponding torque is applied to the ring gear shaft 32a as the applied torque. It should be noted that the relation between a torque output from the motor MG1 and a torque applied to the ring gear shaft 32a can be easily derived from the aforementioned alignment chart shown in FIG. 7. In this way, the current commands Id2* and Iq2* of the d and q axes in the control electric angle θeset is set; and as described in FIG. 6, an absorbed torque is applied to minimize the difference between the magnetic field direction of the stator 46b (direction of the d axis in the control electric angle θeset) and the present direction of the d axis so that the rotor 46a may not be rotated. Furthermore, the current command Id2* of the d axis can be set more appropriately by setting the current command Id2* of the d axis based on the drive state of the engine 22 and the motor MG1. It should be noted that when the value of the rotation restriction index Jm2 is 0 and a value 0 is set to the current command Id2* of the d axis, an absorbed torque may not be generated, and the rotor 46a enters a free state.

[Formula 2]

$$\begin{bmatrix} Id2 \\ Iq2 \end{bmatrix} = \sqrt{2} \begin{bmatrix} \sin(\theta\, eset + \frac{\pi}{3}) & \sin(\theta\, eset) \\ \cos(\theta\, eset + \frac{\pi}{3}) & \cos(\theta\, eset) \end{bmatrix} \begin{bmatrix} Iu2 \\ Iv2 \end{bmatrix} \quad (3)$$

When the current commands Id2* and Iq2* are set, the set current commands Id2* and Iq2* and currents Id2 and Iq2 are used to compute the voltage commands Vd2* and Vq2* of the d and q axes from the following Formulae (4) and (5) (step S470). The control electric angle θeset is used to perform a coordinate transformation (2 phase to 3 phase transformation) from the computed voltage commands Vd2* and Vq2* of the d and q axes to the voltage commands Vu2*, Vv2*, and Vw2* to be applied to a U phase, a V phase and a W phase of a three-phase coil of the motor MG2 using the following Formulae (6) and (7) (step S480). Then the routine converts the coordinate-transformed voltage commands Vu2*, Vv2*, and Vw2* to PWM signals for switching the transistors T7 to T12 of the inverter 42 (step S490). Then the routine outputs the converted PWM signals to the transistors T7 to T12 of the inverter 42, to drive-control the motor MG2 (step S500). Then the in-parking-position second motor control routine terminates processing. Here, "k31" and "k5" indicate proportional coefficients; and "k41" and "k6" indicate integral coefficients in the Formulae (4) and (5).

[Formula 3]

$$Vd2^* = k3(Id2^* - Id2) + \sum k4(Id2^* - Id2) \quad (4)$$

$$Vq2^* = k5(Iq2^* - Iq2) + \sum k6(Iq2^* - Iq2) \quad (5)$$

$$\begin{bmatrix} Vu2^* \\ Vv2^* \end{bmatrix} = \sqrt{\frac{2}{3}} \begin{bmatrix} \cos(\theta\, eset) & -\sin(\theta\, eset) \\ \cos(\theta\, eset - \frac{2\pi}{3}) & -\sin(\theta\, eset - \frac{2\pi}{3}) \end{bmatrix} \begin{bmatrix} Vd2^* \\ Vq2^* \end{bmatrix} \quad (6)$$

$$Vw2^* = -Vu2^* - Vv2^* \quad (7)$$

Figure 9:
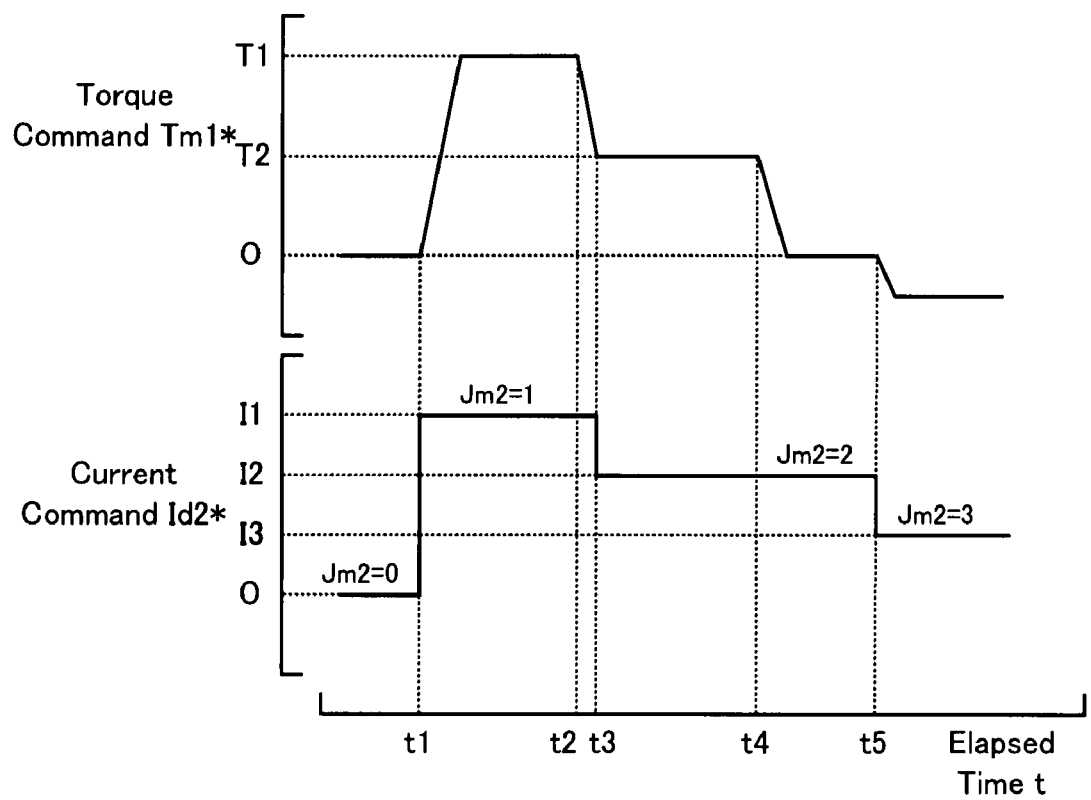
FIG. 9 is an explanatory drawing showing an example of a relation between a torque command Tm1* of a motor MG1 when the engine 22 is started by motoring and then driven and a current command Id2* of a shaft d in electric angle θeset for controlling the motor MG2.

FIG. 9 is an explanatory drawing showing an example of a relation between a torque command Tm1* of a motor MG1 when the engine 22 is started by motoring and then operated and a current command Id2* of the d axis in a control electric angle θeset of the motor MG2. As shown in the drawing, during the time period until the time t1 when the engine 22 is stopped, the value of the rotation restriction index Jm2 is 0 and a value 0 is set to the current command Id2* of the d axis; during the time period from t1 to t3, when a relatively large torque (such as predetermined torque T1) is set to the torque command Tm1* of the motor MG1, the value of the rotation restriction index Jm2 is 1 and a predetermined current I1 having a relatively high value is set to the current command Id2* of the d axis; during the time period from t3 to t5, when a torque output from the motor MG1 becomes equal to or less than a predetermined torque T2, the value of the rotation restriction index Jm2 is 2 and a predetermined current I2 having a value smaller than a predetermined current I1 is set to the current command Id2* of the d axis; and after time t5, when the start of the engine 22 is completed and the engine 22 is operated, the value of the rotation restriction index Jm2 is 3 and a predetermined current I3 having a value smaller than a predetermined current I2 is set to the current command Id2* of the d axis. In this way, the current command Id2* of the d axis in the control electric angle θeset is set based on the rotation restriction index Jm2 which is set according to the drive state of the engine 22 and the motor MG1. Therefore, the magnetic field direction of the stator 46b of the motor MG2 is fixed to appropriately prevent the rotor 46a from rotating. Accordingly, this embodiment can prevent current to be applied to a three-phase coil of the stator 46b of the motor MG2 in comparison with other methods in which a relatively large current (such as a predetermined current I1) is set to the current command Id2* of the d axis regardless of a drive state of the engine 22 and the motor MG1. Thus this embodiment serves to save current and improve energy efficiency. In addition, this embodiment can assuredly prevent the rotor 46a of the motor MG2 from rotating in comparison with other methods in which a relatively small current (such as a predetermined current I2 or I3) is set to the current command Id2* of the d axis regardless of a drive state of the engine 22 and the motor MG1.

According to the hybrid vehicle 20 in this embodiment described above, the rotation restriction index Jm2 is set based on a drive state of the engine 22 and the motor MG1, and the current command Id2* of the d axis in the control electric angle θeset is set based on the set rotation restriction index Jm2; a value 0 is set to the current command Iq2* of the q axis, and the magnetic field direction of the stator 46b is fixed based on the set current commands Id2* and Iq2* to control the motor MG2 to prevent the rotor 46a from rotating. Thus, the rotor 46a (ring gear shaft 32a) can be controlled not to rotate according to the drive state of the engine 22 and the motor MG1.

According to the hybrid vehicle 20 in this embodiment, an electric angle θe2 at the time when the motoring of the engine 22 in a stop state started is set as the control electric angle θeset, but the electric angle is not restrictive to this electric angle θe2 at the time when the motoring of the engine 22 in a stop state started; for example, an electric angle θe2 at the time when the engine 22 is in a stop state, i.e., before the motoring of the engine 22 started may also set as the control electric angle θeset.

According to the hybrid vehicle 20 in this embodiment, a value 0 is set to the rotation restriction index Jm2 when the engine 22 is stopped, but a value other than 0 may be set to the rotation restriction index Jm2 in the same way when the engine 22 is operating or motoring. In other words, even when the engine 22 is stopped, the motor MG2 may be controlled by applying current to the motor MG2, and fixing the magnetic field direction of the stator 46b of the motor MG2 to prevent the rotor 46a from rotating. In this case, for example, an electric angle θe2 at the time when the engine 22 is stopped may be used as the control electric angle θeset.

According to the hybrid vehicle 20 in this embodiment, the hybrid electronic control unit 70 sets the rotation restriction index Jm2 based on a drive state of the engine 22 and the motor MG1 and sends this to the motor ECU 40; and the motor ECU 40 sets the current command Id2* of the d axis for a 3 phase to 2 phase conversion based on the rotation restriction index Jm2, but without setting the rotation restriction index Jm2, the motor ECU 40 may set the current command Id2* of the d axis for a 3 phase to 2 phase conversion based on a drive state of the engine 22 and the motor MG1.

According to the hybrid vehicle 20 in this embodiment, when the motor MG1 is motoring the engine 22 to start or stop the engine 22, the routine sets a value 1 or 2 to the rotation restriction index Jm2 based on a torque output from the motor MG1, and controls the motor MG2 using this rotation restriction index Jm2, but regardless of a torque output from the motor MG1, the routine may be configured to set a value 1 to the rotation restriction index Jm2 and control the motor MG2 using this rotation restriction index Jm2. In this case, when the motor MG1 is motoring the engine 22 to start or stop the engine 22, a relatively large torque is output from the motor MG1, or a relatively large torque is applied to the ring gear shaft 32a as an aforementioned applied torque. The reason why a value 1 is set to the rotation restriction index Jm2 is to prevent the ring gear shaft 32a serving as a power shaft from rotating.

According to the hybrid vehicle 20 in this embodiment, when the engine 22 is operating, a value 3 is set to the rotation restriction index Jm2 regardless of an operating point of the engine 22 (rotation speed Ne and torque Te) and this rotation restriction index Jm2 is used to control the motor MG2, but the rotation restriction index Jm2 may be set based on the operating point of the engine 22 and this rotation restriction index Jm2 is used to control the motor MG2.

According to the hybrid vehicle 20 in this embodiment, each of the predetermined currents I1, I2, and I3 is set to have a smaller value in this order, but the predetermined current I3 may have a value equal to or greater than the predetermined current I1 based on a drive state of the engine 22 and the motor MG1; or the predetermined current I3 may have a value less than the predetermined current I1 and equal to or greater than the predetermined current I2.

According to the hybrid vehicle 20 in this embodiment, the routine sets the current command Id2* of the d axis in the control electric angle θeset based on the rotation restriction index Jm2, and sets a value 0 to the current command Iq2* of the q axis to the d-q coordinate, and controls the motor MG2 based on the set current commands Id2* and Iq2* of the d and q axes, but the routine may control the motor MG2 without a 3 phase to 2 phase transformation, provided that a current based on the rotation restriction index Jm2 is applied to the motor MG2 to fix the magnetic field direction of the stator 46b of the motor MG2.

According to the hybrid vehicle 20 in this embodiment, the transmission 60 can change the rotation speed to one of the four speeds. However, the number of speeds is not restrictive to four, and any transmission capable of changing two or more speeds may be used as the transmission 60.

Figure 10:
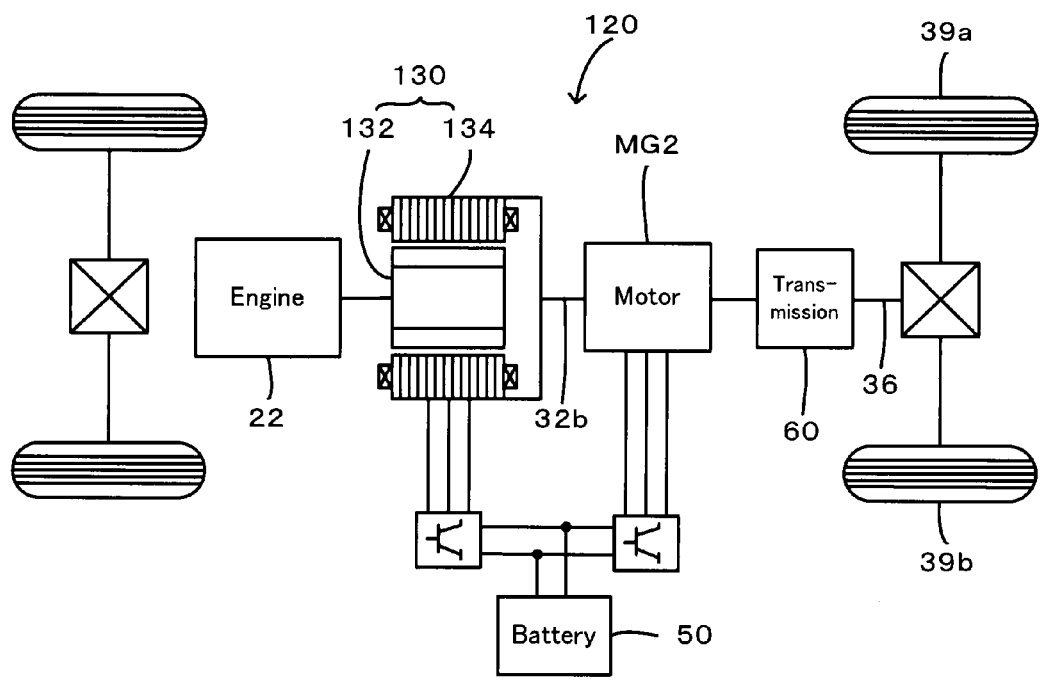
FIG. 10 is a block diagram showing a schematic configuration of a hybrid vehicle 120 in accordance with another embodiment of the present invention.

According to the hybrid vehicle 20 in this embodiment, a mechanical power is output via the power distribution integration mechanism 30 from the engine 22 to the ring gear shaft 32a connected via the transmission 60 to the drive shaft 36 coupled to drive wheels 39a and 39b. But as shown in FIG. 10, the hybrid vehicle 120 in another embodiment may be equipped with a pair-rotor motor 130, which includes an inner rotor 132 connected to crankshaft 26 of the engine 22 and an outer rotor 134 connected to the drive shaft 32b connected via the transmission 60 to the drive shaft 36 which outputs a mechanical power to the drive wheels 39a and 39b. The pair-rotor motor 130 which transmits a part of a mechanical power of the engine 22 to the drive wheels 39a and 39b via the power shaft 32b, the transmission 60, and the drive shaft 36, and converts remaining mechanical power to an electric power.

According to the hybrid vehicle 20 in this embodiment, its mechanical power source includes the engine 22, the power distribution integration mechanism 30, and the motor MG1, but the power source may include an engine only or may include a motor only.

Here, the relation between the major components of embodiments and modifications and the major components of the invention described in SUMMARY will be described. "Mechanical power source" described in SUMMARY corresponds to the power distribution integration mechanism 30 including a carrier 34 connected to the crankshaft 26 of the engine 22 and the engine 22 and the ring gear 32 connected to the ring gear shaft 32a serving as a power shaft; and the motor MG1 connected to sun gear 31 of the power distribution integration mechanism 30. "Electric motor" corresponds to the motor MG2 which inputs and outputs a mechanical power to the ring gear shaft 32a by rotating the rotor 46a based on the rotating magnetic field of the stator 46b having the rotor 46a connected to the ring gear shaft 32a serving as a power shaft. "Accumulator" corresponds to the battery 50 which sends and receives an electric power to and from the motors MG1 and MG2. "Transmission" corresponds to the transmission 60 which transmits a mechanical power accompanying a change of gears between the ring gear shaft 32a serving as a power shaft and the drive shaft 36 coupled to the drive wheels 39a and 39b, and disconnect the ring gear shaft 32a and the drive shaft 36. "Control module" corresponds to the hybrid electronic control unit 70 which performs the processes of steps S130, S160, S170, S240, S250, S290, and S300 in which the rotation restriction index Jm2 is set based on an operating state of the engine 22 and a drive state of the motor MG1 when the shift lever 81 is in the parking position and the set rotation restriction index Jm2 is sent to the motor ECU 40; and the motor ECU 40 which executes the process of S460 in which the current command Id2* of the d axis in the control electric angle θeset is set based on the rotation restriction index Jm2 received from the hybrid electronic control unit 70, and a value 0 is set to the current command Iq2* of the q axis, and processes of S470 to S500 for controlling motor MG2 using the current commands Id2* and Iq2* of the d and q axes. "Rotational position detecting module" corresponds to the rotational position detecting sensor 44 which detects a rotational position θm2 of the rotor 46a of the motor MG2; and the motor ECU 40 which executes the process of the S410 for calculating an electric angle θe2 based on the detected rotational position θm2. "Control rotational position setting module" corresponds to the motor ECU 40 which executes the processes of the S420 to S440 for setting as the control electric angle θeset the electric angle θe2 at the time when motoring of the engine 22 in a stop state is started. It should be noted that in the relation between the major components of embodiments and modifications and the major components of the invention described in SUMMARY, an embodiment is shown as an example of describing the best mode for carrying out the invention; thus the major components of embodiments and modifications do not limit the components of the invention described in SUMMARY. In other words, the invention described in SUMMARY shall be construed based on the descriptions given in SUMMARY, and an embodiment is just an example of the invention described in SUMMARY.

The embodiment regards application of the invention to the hybrid vehicle. This application is, however, only illustrative and not restrictive in any sense. The technique of the invention may be actualized by diversity of other applications, for example, various vehicles including automobiles and other vehicles as well as control methods of such various vehicles.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2006-249966 filed Sep. 14, 2006 including specification, drawings and claims is incorporated herein by reference in its entirety.

What is claimed is:

1. A vehicle comprising:
a mechanical power source capable of outputting a mechanical power to a power shaft;
an electric motor which has a rotor connected to said power shaft, and causes said rotor to rotate with a rotating magnetic field of a stator to input and output the mechanical power to and from said power shaft;
a accumulator capable of sending and receiving an electric power to and from at least said electric motor;
a transmission capable of transmitting the mechanical power accompanying a change of gears between said power shaft and an axle side, and releasing the connection between said power shaft and said axle side; and
a control module of controlling said electric motor such that when a shift lever is in a parking position, a magnetic field direction of said stator is fixed based on a drive state of said mechanical power source to limit the rotation of said rotor,
wherein said mechanical power source includes an internal combustion engine and an electric power-mechanical power input output structure which is connected to an output shaft of said internal combustion engine and said power shaft, can send and receive an electric power to and from said accumulator, and outputs at least a part of a mechanical power from said internal combustion engine accompanying an input and output of the electric power and the mechanical power to said power shaft,
wherein said control module performs control so as to limit the rotation of said rotor by fixing a magnetic field direction of said stator based on at least one of a drive state of said internal combustion engine and a drive state of said electric power-mechanical power input output structure, and
wherein said control module uses said electric power-mechanical power input output structure to perform control so as to prevent said rotor from rotating by setting a first index as a rotation restriction index when said internal combustion engine is motoring to start or stop said internal combustion engine; by setting a second index other than the first index as said rotation restriction index when the internal combustion engine is operating; and by fixing the magnetic field direction of said stator based on the set rotation restriction index.

2. A vehicle according to claim 1, wherein said control module sets a third index other than the first index as said rotation restriction index when a drive state of said electric power-mechanical power input output structure is a predetermined drive state and when said internal combustion engine is motoring by said electric power-mechanical power input output structure to start or stop said internal combustion engine.

3. A vehicle according to claim 1, wherein said control module performs control so as to prevent said rotor from rotating by applying current based on the set rotation restriction index to said electric motor to fix the magnetic field direction of said stator.

4. A vehicle according to claim 1, wherein said electric power-mechanical power input output structure includes: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

5. A vehicle according to claim 1, comprising a rotational position detecting module for detecting a rotational position of a rotor of said electric motor, and
a control rotational position setting module for setting a control rotational position based on the detected rotational position,
said control module performing control so as to limit the rotation of said rotor by fixing the magnetic field direction of said stator using the set control rotational position.

6. A vehicle according to claim 5, wherein said electric motor is a three-phase alternating-current motor, and
said control module performs control so as to limit the rotation of said rotor by calculating currents of the d and q axes by performing a three-phase to two-phase conversion on the current applied to each phase of said electric motor using the set control rotational position; by setting a target current of the d axis in said control rotational position based on a drive state of said mechanical power source; by setting a value 0 to the target current of the q axis in said control rotational position; and by fixing the magnetic field direction of said stator based on the set target currents of the d and q axes and the calculated currents of the d and q axes.

7. A method of controlling a vehicle comprising: a mechanical power source capable of outputting a mechanical power to a power shaft; an electric motor which includes a rotor connected to said power shaft, causes said rotor to rotate with a rotating magnetic field of a stator to input and output the mechanical power to and from said power shaft; a accumulator capable of sending and receiving an electric power to and from at least said electric motor; a transmission capable of transmitting the mechanical power accompanying a change of gears between said power shaft and an axle side, and releasing the connection between said power shaft and said axle side,
wherein said method comprises controlling said electric motor so as to limit the rotation of said rotor by fixing the magnetic field direction of said stator based on a drive state of said mechanical power source when a shift lever is in a parking position,
wherein said mechanical power source includes an internal combustion engine and an electric power-mechanical power input output structure which is connected to an output shaft of said internal combustion engine and said power shaft, can send and receive an electric power to and from said accumulator, and outputs at least a part of a mechanical power from said internal combustion engine accompanying an input and output of the electric power and the mechanical power to said power shaft,
wherein said method performs control so as to limit the rotation of said rotor by fixing a magnetic field direction of said stator based on at least one of a drive state of said internal combustion engine and a drive state of said electric power-mechanical power input output structure, and
wherein said method uses said electric power-mechanical power input output structure to perform control so as to prevent said rotor from rotating by setting a first index as a rotation restriction index when said internal combustion engine is motoring to start or stop said internal combustion engine, and wherein by setting a second index other than the first index as said rotation restriction index when the internal combustion engine is operating; and by fixing the magnetic field direction of said stator based on the set rotation restriction index.

8. A method of controlling a vehicle according to claim 7, setting a third index other than the first index as said rotation restriction index when a drive state of said electric power-mechanical power input output structure is a predetermined drive state and when said internal combustion engine is motoring by said electric power-mechanical power input output structure to start or stop said internal combustion engine.

9. A method of controlling a vehicle according to claim 7, performing control so as to prevent said rotor from rotating by applying current based on the set rotation restriction index to said electric motor to fix the magnetic field direction of said stator.

* * * * *

UNITED STATES PATENT AND TRADEMARK OFFICE
CERTIFICATE OF CORRECTION

PATENT NO.        : 7,694,763 B2
APPLICATION NO.   : 11/898304
DATED             : April 13, 2010
INVENTOR(S)       : Shinichi Sugai et al.

It is certified that error appears in the above-identified patent and that said Letters Patent is hereby corrected as shown below:

| Column | Line | |
|--------|------|---|
| 15 | 35 | Change "Here, "k31" and" to --Here, "k3" and--. |
| 15 | 36 | Change "and "k41" and" to --and "k4" and--. |

Signed and Sealed this

Fifteenth Day of June, 2010

David J. Kappos
*Director of the United States Patent and Trademark Office*